United States Patent
Protzmann et al.

(10) Patent No.: US 9,701,846 B2
(45) Date of Patent: Jul. 11, 2017

(54) TYPE OF ROAD MARKINGS FOR SUPPORTING THE ENVIRONMENT DETECTION OF VEHICLES

(71) Applicants: Guido Protzmann, Bensheim (DE); Joern Kiwitt, Muenster (DE); Dominik Kiefer, Pfinztal (DE); Guenter Schmitt, Darmstadt (DE); Marita Kaufmann, Griesheim (DE); Michael Olapoju, Wiesbaden (DE)

(72) Inventors: Guido Protzmann, Bensheim (DE); Joern Kiwitt, Muenster (DE); Dominik Kiefer, Pfinztal (DE); Guenter Schmitt, Darmstadt (DE); Marita Kaufmann, Griesheim (DE); Michael Olapoju, Wiesbaden (DE)

(73) Assignee: EVONIK ROEHM GmbH, Darmstadt (DE)

( * ) Notice: Subject to any disclaimer, the term of this patent is extended or adjusted under 35 U.S.C. 154(b) by 0 days.

(21) Appl. No.: 14/422,483

(22) PCT Filed: Nov. 6, 2013

(86) PCT No.: PCT/EP2013/073091
§ 371 (c)(1),
(2) Date: Feb. 19, 2015

(87) PCT Pub. No.: WO2014/082821
PCT Pub. Date: Jun. 5, 2014

(65) Prior Publication Data
US 2015/0247297 A1    Sep. 3, 2015

(30) Foreign Application Priority Data

Nov. 28, 2012    (EP) .................... 12194578

(51) Int. Cl.
| | | |
|---|---|---|
| *E01C 5/00* | (2006.01) | |
| *C09D 5/33* | (2006.01) | |
| *E01C 7/35* | (2006.01) | |
| *E01C 9/00* | (2006.01) | |
| *E01C 11/00* | (2006.01) | |
| *E01F 9/30* | (2016.01) | |
| *E01F 9/506* | (2016.01) | |
| *E01F 9/524* | (2016.01) | |
| *E01F 9/518* | (2016.01) | |

(52) U.S. Cl.
CPC .............. *C09D 5/004* (2013.01); *E01C 7/356* (2013.01); *E01C 9/001* (2013.01); *E01C 11/00* (2013.01); *E01F 9/30* (2016.02); *E01F 9/506* (2016.02); *E01F 9/518* (2016.02); *E01F 9/524* (2016.02); *Y10T 428/12014* (2015.01); *Y10T 428/12028* (2015.01); *Y10T 428/2993* (2015.01); *Y10T 428/2998* (2015.01)

(58) Field of Classification Search
CPC .......... E01C 7/356; E01C 9/001; E01C 9/005; E01C 11/00; E01F 9/005; E01F 9/044; C09D 5/004; Y10T 428/12014; Y10T 428/12028; Y10T 428/2993; Y10T 428/2998
USPC ......................... 404/12–16, 94, 75
See application file for complete search history.

(56) References Cited

U.S. PATENT DOCUMENTS

| | | | | |
|---|---|---|---|---|
| 2,260,461 A | * | 10/1941 | Kolts | B05B 7/1495 239/1 |
| 3,417,677 A | * | 12/1968 | Moser | E01C 7/353 404/14 |
| 3,418,896 A | * | 12/1968 | Rideout | B29D 11/00615 359/540 |
| 3,428,514 A | * | 2/1969 | Greer | C08F 2/44 359/515 |
| 3,958,891 A | * | 5/1976 | Eigenmann | E01C 7/35 359/536 |
| 3,969,547 A | * | 7/1976 | Isawa | B01J 13/125 427/214 |
| 4,361,202 A | * | 11/1982 | Minovitch | B60K 31/0008 104/88.02 |
| 4,983,458 A | * | 1/1991 | Dejaiffe | B29C 43/085 359/540 |

(Continued)

FOREIGN PATENT DOCUMENTS

| | | |
|---|---|---|
| EP | 0676506 A2 | 10/1995 |
| EP | 0676506 A3 | 10/1995 |

(Continued)

OTHER PUBLICATIONS

International Search Report issued Jan. 29, 2014 in PCT/EP2013/073091 filed Nov. 6, 2013.

(Continued)

*Primary Examiner* — Raymond W Addie
(74) *Attorney, Agent, or Firm* — Oblon, McClelland, Maier & Neustadt, L.L.P.

(57) ABSTRACT

A radiation-reflecting road marking, comprising: metal particles having a diameter of between 0.5-2.5 mm, wherein the metal particles are particles comprising aluminum, magnesium, zinc or an alloy thereof. Also, a method for producing the radiation-reflecting road marking, where the radiation-reflecting road marking is a cold plastic, by mixing components of a two-part system, if necessary, to form a mixture, applying the mixture to a road surface, and adding the metal particles and optionally glass beads during or directly after an application of the cold plastic to the road surface.

17 Claims, No Drawings

(56) References Cited

U.S. PATENT DOCUMENTS

| | | | | |
|---|---|---|---|---|
| 5,453,320 A * | 9/1995 | Harper | | B32B 25/04 |
| | | | | 404/12 |
| 5,698,259 A * | 12/1997 | Collinucci | | B05B 7/224 |
| | | | | 180/168 |
| 6,081,187 A * | 6/2000 | Akutsu | | G01S 13/878 |
| | | | | 180/168 |
| 6,110,566 A * | 8/2000 | White | | B32B 3/30 |
| | | | | 264/1.9 |
| 6,217,252 B1 | 4/2001 | Tolliver et al. | | |
| 6,696,126 B1 * | 2/2004 | Fischer | | G02B 5/128 |
| | | | | 359/515 |
| 8,425,144 B2 * | 4/2013 | Bjorklund | | E01C 23/166 |
| | | | | 404/14 |
| 2003/0217808 A1 * | 11/2003 | Woods | | C09J 4/00 |
| | | | | 156/332 |
| 2004/0146349 A1 | 7/2004 | Saito et al. | | |
| 2007/0077119 A1 * | 4/2007 | Northey | | E01F 9/083 |
| | | | | 404/12 |
| 2007/0194248 A1 * | 8/2007 | Belov | | C09K 11/7701 |
| | | | | 250/458.1 |
| 2007/0251424 A1 * | 11/2007 | Handrosch | | C04B 20/12 |
| | | | | 106/472 |
| 2008/0145146 A1 * | 6/2008 | Shipman | | B29D 11/00605 |
| | | | | 404/14 |
| 2008/0236008 A1 * | 10/2008 | Greer | | E01F 9/042 |
| | | | | 40/594 |
| 2011/0081553 A1 * | 4/2011 | Mehlmann | | B05D 5/02 |
| | | | | 428/522 |
| 2011/0123769 A1 * | 5/2011 | Greer | | E01F 9/042 |
| | | | | 428/143 |
| 2012/0296026 A1 * | 11/2012 | Hashizume | | C03C 17/3605 |
| | | | | 524/403 |

FOREIGN PATENT DOCUMENTS

| | | |
|---|---|---|
| EP | 1460180 A1 | 9/2004 |
| WO | 96/16231 A1 | 5/1996 |
| WO | 00/09811 A1 | 2/2000 |

OTHER PUBLICATIONS

European Search Report issued Apr. 10, 2013 in European Application 12194578.6 filed Nov. 28, 2012.

* cited by examiner

TYPE OF ROAD MARKINGS FOR SUPPORTING THE ENVIRONMENT DETECTION OF VEHICLES

FIELD OF THE INVENTION

The present invention encompasses an innovative concept for the marking of trafficways, more particularly roads. The application qualities and lifetime of these new markings are comparable with those of the prior art. The markings also possess properties comparable with those of the prior art in respect of night visibility, back-in-service time, and surface quality. An additional contribution of the markings of the present invention, however, is that they can be used to support driver assistance systems and autonomous vehicles. With this in mind, the present invention relates more particularly to road markings which, building on established systems, are equipped with additional reflection capacity for electromagnetic radiation, more particularly for microwaves and/or infrared radiation.

PRIOR ART

Driver assistance systems (DAS) have already been under the spotlight in automobile development for some considerable time. The systems raise levels of driving comfort and traffic safety. Examples of current systems include adaptive cruise control, emergency braking assistants, parking aids and lane-change assistants. Customarily, radar sensors, infrared sensors, lidar sensors, camera sensors and/or ultrasound sensors are used for the peripheral perception.

Many driver assistance systems, such as lane departure warning systems, for example, require reliable information concerning the trafficway, such as lane width, number of lanes and road course, for instance. Moreover, the vehicle position relative to the trafficway must be known. The reliable capture of this data is especially important in relation in particular to the future vision of Autonomous Driving.

The information concerning the static environment of the vehicle may take the form of a stored map. All that is required is to undertake positioning within the map. Location may be carried out, for example, using a global navigation satellite system (GNSS) such as GPS or Galileo. A disadvantage here is that the location accuracy is not sufficient to guarantee reliable operation of driver assistance systems and autonomous vehicles. More precise location can be obtained using a local, radio-based or optical location system along the trafficway. The construction of this infrastructure, however, is costly and involved.

In the case of the method with a stored map, an additional drawback is that the map must correspond precisely to reality. This cannot be guaranteed, in light of temporary disruptions or changes to the course of the trafficway, such as construction sites, for example.

For the reasons given, it is essential, for DAS and autonomous vehicles, for precise information concerning the trafficway/lane and the vehicles' own position relative thereto to be reliably determined during driving.

At the present time, this function is fulfilled almost exclusively using video cameras, which are usually mounted behind the windscreen, on the rear view mirror. The traffic lanes are detected in the video image by means of digital image processing. These traffic lanes are recognized primarily from the trafficway markings.

The systems are unable, however, to recognize the traffic lanes reliably in every situation. Problems occur in construction sites if temporary trafficway markings are being employed. The optical measurement method also reaches limits in adverse weather conditions such as fog, rain and snow. Difficulties are also encountered when the sun is low and therefore blinding. When there is a lack of contrast between trafficway markings and trafficway topping, and also in the case of trafficway markings that have eroded or are simply absent, the traffic lane in some cases cannot be recognized at all. Furthermore, tar joins on the trafficway can lead to misinterpretations in lane recognition.

For the reasons given, the need exists to allow trafficway markings to be recognized more reliably by driver assistance systems and autonomous vehicles. To date there has been no description in the prior art of trafficway markings adapted to the requirements of automotive systems for peripheral perception.

There are a variety of kinds of road markings.

Currently in use as trafficway marking materials are systems such as solvent-based paints, water-based paints, thermoplastic paints, paints based on reactive resins, or cold plastics, and prefabricated adhesive tapes. A disadvantage of the latter is that they are costly and involved in their production and their application. Also, with a view to a desired long life for the marking, there are only limited degrees of freedom concerning the design of the marking, with glass beads, for example.

Solvent-based paints are a very old art and have the particular disadvantage that they cannot, for example, be equipped with glass beads in order to enhance light reflection.

Marking films, especially those with glass beads on the surface for the purpose of enhancing night visibility, are described in WO 99/04099 and WO 99/04097, for example. Also disclosed in these specifications is a corresponding process for producing the marking films and for equipping these films with glass beads.

Road markings based on reactive resin are found for example in patent applications EP 2 054 453, EP 2 454 331, EP 2 528 967, WO 2012/100879 and WO 2012/146438.

Aqueous marking systems are described for example in EP 2 077 305, EP 1 162 237 and U.S. Pat. No. 4,487,964.

OBJECT

It is an object of the present invention to provide a new concept for road marking that makes a contribution to peripheral perception by vehicles.

A particular object of the present invention is the provision of a new road marking which, particularly at the surface, reflects microwaves and/or infrared radiation.

A further object of the present invention is that this road marking should be easy to apply and should have a long lifetime.

A particular object is that these innovative road markings can be made available by modification of established systems and hence can be laid or applied with existing techniques, without additional conversion of the corresponding machines.

Other objects, not explicitly stated, will become apparent from the overall context of the following description, claims and examples.

Solution

The objects are achieved by an innovative, radiation-reflecting road marking which comprises metal particles having a diameter of between 10 µm and 1 cm, preferably between 0.1 mm and 5 mm and more preferably between 0.5 and 2.5 mm.

These metal particles reflect electromagnetic radiation given off, for example, by a corresponding device on a vehicle. At the same time the vehicle may be equipped with a corresponding detector that detects the reflected radiation. In this way information to control the vehicle can be read off directly on the road surface, from the road marking. The stated electromagnetic radiation may be, for example, visible light. Preferably the electromagnetic radiation is microwave radiation and/or infrared radiation, very preferably within a frequency range between 3 GHz and 300 GHz. The waves in question are more particularly centimeter waves and millimeter waves. Current automotive radar sensors operate especially in a frequency band around about 24 GHz. However, there are also systems which detect within frequency bands between 77 and 81 GHz. Newer systems can also be used in a range around 120 GHz.

Metal of which the metal particles used in accordance with the invention consist means, in accordance with the invention, an elemental metal and not a metal compound such as a metal oxide. The metal particles certainly do, however, include particles consisting predominantly of an elemental metal with an external passivation layer, more particularly an external oxide layer. An oxide layer of this kind is usually produced during manufacture or is formed automatically, as in the case of aluminium, for example.

The metal particles are more preferably particles which consist wholly or partly of aluminium, zinc or magnesium or of an alloy predominantly comprising, i.e. comprising at least 50 wt %, preferably at least 70 wt % of magnesium, aluminium or zinc. Especially preferred particles are those which consist wholly or partly of aluminium. Furthermore, iron particles would also be suitable. Different materials, however, may also be combined with one another. This can be done, for example, through the use of more than one kind of metal particle.

In the simplest embodiment of the invention the metal particles are solid metal particles—i.e. particles which consist wholly of the metal. The invention, though, is not confined to particles of this kind. Thus it also possible for hollow metallic beads to be employed. Moreover, the surface of the particle may have a coating of the metal, beneath which there is a different material such as glass or a plastic, for example. One particular embodiment of the invention embraces metal, very preferably in bead form, coated with glass, PMMA or polycarbonate. Particles of this latter embodiment not only contribute to reflection of the stated electromagnetic radiation—that is, more particularly, of microwaves and/or infrared radiation—but also, in addition, reflect visible light very well. As a result, if the particles are present on the surface of the road marking, it is also possible, additionally, to ensure reflection of visible light. The latter is particularly significant at night and to date, in accordance with the prior art, has been achieved predominantly by means of pure glass beads.

The metal particles used in accordance with the invention can be present in a variety of forms. They are preferably spherical. It is also possible, however, for oval or triple mirror-formed particles or flakes, for example, to be used. Furthermore, for example, particles may be used that have a non-smooth shape on a rounded basic shape.

The diameter in accordance with the invention relates to the widest part of the particle. In the case of an oval particle, for instance, the diameter is measured between the two points that are furthest apart from one another. The stated diameter refers to the numerical average. The diameter of these particles may be measured by microscopy, for example.

The particles may simply be embedded into the matrix material of the road marking. Even if the metal particles are completely enclosed by this matrix material, the reflection of microwaves, for example, is still possible.

Alternatively the metal particles are situated on the surface of the road marking. Particularly in such an embodiment—but also with complete embedding as well—it is preferred if, additionally, adhesion promoters are used in order to improve the adhesion of the metal particles to the material of the road marking.

To this end there are two alternative embodiments. In the first, the metal particles are provided on the surface with an adhesion promoter. In the second embodiment, the matrix material of the road marking comprises the adhesion promoter.

Suitable adhesion promoters encompass a range of substances. In each specific case, the choice of adhesion promoter by the skilled person is made on the basis, in particular, of the choice of the matrix material and of the metal used. Examples of such adhesion promoters are silanes, hydroxy esters, amino esters, urethanes, isocyanates and/or acids that are copolymerizable with (meth)acrylates. In the case of the silanes, the system in question may, for example, involve silanization of the—oxidic, for example—glass or metal surface. An alternative possibility, for example, is to use an alkoxy- and/or hydroxysilylalkyl (meth)acrylate, of the kind sold by Evonik Industries AG under the name Dynasylan® MEMO, for example. One example of a hydroxy ester is hydroxyethyl methacrylate. Examples of a copolymerizable acid are itaconic acid, maleic acid, methacrylic acid, acrylic acid, β-carboxyethyl acrylate or the corresponding anhydrides. An amino ester is, for example, N-dimethylaminopropylmethacrylamide.

The chosen amount of the metal particles used can be varied to a relatively high degree. The limiting factor on the minimum amount is sufficient detection by a sensor. A sufficient minimum amount may be achieved with just a 0.1 area % coverage of the marking by metal particles. In respect in particular of the longevity of the reflection capacity, however, larger amounts are preferred. For the skilled person, guidance in this context may be taken from the amount of glass beads typically used. Similar amounts of glass beads scattered additionally onto the marking are not a disruption here. Overall, nevertheless, it should of course be ensured that the total area of glass beads and metal particles placed onto the surface is less than the area of the marking in such a way that the majority of the particles and beads achieve contact with the surface of the material. If the metal particles are incorporated into the matrix in such a way that they are fully enclosed by the matrix, care should be taken to ensure that the cohesion of the matrix is not disrupted by too large a quantity of particles.

In the case of adhesive sheets, the number of metal beads should be considered in the same way as for the lower limit. As far as the upper limit is concerned, it is entirely possible for an opaque layer of the metal particles to be formed.

The solution according to the invention, of a road marking comprising metal particles, may be based on diverse established road marking systems. The only critical factor for its implementation is that a road marking is selected in which sufficient adhesion for the metal particles is ensured. Road markings suitable in principle are those into which glass beads can be incorporated. The road markings that can be used are preferably structural markings, more particularly cold plastics, adhesive tapes or water-based paints—the latter more particularly in a structural marking configuration.

If the road marking comprises a prefabricated adhesive tape, the metal particles can be added in the same way as for the glass beads during the production of the adhesive tape. WO 99/04099, for instance, describes a technique wherein the adhesive tape is coated with a layer of adhesion promoter or with the melt of a thermoplastic and subsequently, in the same operation, glass beads are scattered onto this still-adhesive layer. This thermoplastic may also be applied in structures or local elevations, so that in this way a local accumulation of the beads or a pattern thereof is obtained. This method can also be applied simply to metal particles by analogy.

Alternatively, an adhesive layer can also be applied to the top face of the adhesive tape, and the metal particles—optionally together with the glass beads—may be applied to said layer by scattering, and subsequently cured and/or sealed with a further coating layer or film layer. It is also possible, furthermore, for the metal particles to be scattered between the two layers in a coextrusion or laminating operation as part of the production of a multi-layer film. Additionally possible, especially in the case of very small metal particles, is the direct coextrusion of the metal particles as part of the adhesive tape production process.

An equally useful alternative to adhesive tapes is represented by structural markings which are applied directly to the trafficway surface. In this case there are two important variants. In one case, the road marking may be a water-based paint. Alternatively, it may be a cold plastic. The latter is obtained by the application and curing of a reactive resin, which is usually a filled resin. In theory, solvent-based systems are also conceivable. In the structural markings sector, however, such systems are relatively insignificant.

Irrespective of which structural marking technology is involved, the metal particles may be incorporated into the marking in similar ways. Both systems, generally, are two-part systems whose components are mixed with one another shortly prior to application. It is also possible for the metal particles to be incorporated by stirring in the same method step. Alternatively the metal particles may also be present in one of the components beforehand. With this approach, road markings are obtained in which the metal particles are predominantly included in the matrix.

It is also possible, however, for the metal particles to be scattered on during or directly after the application of the aqueous coating material or of the cold plastic. In this case a road marking is obtained which has the metal particles predominantly on the surface. Where glass beads are also applied, this can be done in one operation, in the form of a mixture, or directly in succession. Corresponding application technologies are known to the skilled person from the prior art for the application of glass beads.

As already observed, the road marking may additionally have glass beads on the surface. This is so irrespective of whether the metal particles are present in the matrix or are also situated on the surface. If the metal particles are on the surface, they make an additional contribution to light reflection. If the metal particles are present in the matrix, the advantage of this is that they are eroded more slowly by road traffic and are therefore somewhat more long-lived. The above-recited embodiment of metal particles coated transparently with glass, PMMA or polycarbonate is very preferably applied on the surface.

Glass beads are used preferably as reflection means in formulations for trafficway markings and area markings. The commercial glass beads used have diameters of 10 µm to 2000 µm, preferably 50 µm to 800 µm. For improved processing and adhesion the glass beads may be provided with an adhesion promoter. The glass beads may preferably be silanized.

Below, by way of example, the compositions of suitable cold plastics are illustrated. The intention here is to describe in more detail only one possible embodiment, without thereby restricting the present invention to systems of this kind. As already observed, furnishing the road markings on the basis of adhesive tapes or aqueous systems, for example, with metal particles can be realized simply for the skilled person in analogy to their furnishing with glass beads.

A cold plastic of this kind is commonly prepared from a two-part reactive resin. In this case, one component contains 1.0 to 5.0 wt % of an initiator, preferably a peroxide or an azo initiator, more preferably dilauroyl peroxide and/or dibenzoyl peroxide. The other component contains 0.5 to 5.0 wt % of an accelerator, preferably a tertiary, aromatically substituted amine. One of the two components may indeed consist only of the compound or compounds stated. It is also possible for both components to otherwise have an identical composition, or for only one of the two components to comprise the fillers and/or the pigments.

The two components of the reactive resin and hence of the cold plastic formed from it preferably have in total the following further ingredients:

0.1 wt % to 18 wt % of crosslinkers, preferably di-, tri- or polyfunctional (meth)acrylates,
2 wt % to 50 wt % of monomers, preferably (meth) acrylates and/or styrene,
0 wt % to 12 wt % of urethane (meth)acrylates,
0.5 wt % to 30 wt % of prepolymers, preferably polymethacrylates and/or polyesters,
0 wt % to 15 wt % of core-shell particles, preferably based on poly(meth)acrylate,
7 wt % to 15 wt % of an inorganic pigment, preferably titanium dioxide,
30 wt % to 60 wt % of mineral fillers and
optionally further auxiliaries.

The wording "poly(meth)acrylates" encompasses not only polymethacrylates but also polyacrylates and also copolymers or mixtures of both. The wording "(meth) acrylates", accordingly, encompasses methacrylates, acrylates or mixtures of both.

The composition of particularly suitable cold plastics and of the reactive resins that form the basis for these cold plastics may be found by reading, in particular, WO 2012/100879. Details of the further auxiliaries can also be found therein. However, the core-shell particles set out in WO 2012/100879 are not an essential feature for implementing the present invention. Instead, in particular, the proportion of the prepolymers can be higher.

The capability of the trafficway markings produced with this cold plastic to withstand wheeled traffic is particularly good. The term "capability to withstand wheeled traffic", and the synonymously used term "back-in-service time", mean the capacity of the trafficway marking to be subjected to load, for example to support vehicular traffic. The period required to attain capability to withstand wheeled traffic is the period from the application of the trafficway marking to the juncture at which it is no longer possible to discern any alterations in the form of abrasion, of adhesion loss to the trafficway surface or to the embedded metal particles and optional glass beads, or deformation of the marking. Dimensional stability and stability of adhesion are measured in accordance with DIN EN 1542 99 in harmony with DAfStb-RiLi 01.

In terms of the application technology, the systems of the invention can be used flexibly. The reactive resins of the invention, or cold plastics, can be applied, for example, alternatively by spraying, by pouring or by an extrusion process, or manually by means of a trowel, a roller or a doctor system.

Part of the present invention more particularly is a method for producing a road marking of the invention, characterized by the following features: first of all, if necessary, the components of the two-part system are mixed. This mixture is applied to the road surface and, during or directly after the application of the cold plastic to the trafficway surface, the metal particles and optionally glass beads are added. This is done preferably by scattering, more preferably in accelerated form.

When mixing the components it should be borne in mind that after the mixing of the hardener components, i.e. the initiators and the accelerators, the open time that remains for application is limited—from 2 to 40 minutes, for example. Mixing in the course of processing is possible, for example, in modern marking machines which possess a mixing chamber ahead of the applicator nozzle.

Mixing in the hardener following application can be done, for example, by subsequent application with two or more nozzles, or by application of metal particles and/or glass beads that have a coating of hardener. An alternative option is to apply a primer—comprising the hardener component—by spraying before the cold plastic or cold spray plastic is applied. The modern marking machines generally possess one or two further nozzle(s) with which the metal particles and optionally the glass beads are then sprayed on.

The reactive resins of the invention and the cold plastics produced from them are used preferably for producing long-lived trafficway markings. The systems may likewise be used, more particularly in the form of an adhesive tape, with markings intended for time-limited use, as in a construction site area, for example. Their use for the coating of cycleways is additionally conceivable.

The examples given below are given for better illustration of the present invention, but are not such as to confine the invention to the features disclosed herein.

EXAMPLES

The following examples have been conceived as an instruction for performing the present invention. All of these examples exhibit the same good road marking qualities as the parent formulas without metal particles. The formulations of the examples additionally exhibit good reflection of microwave radiation with a frequency of 24 GHz.

For the preparation of the examples, aluminium particles from Eisenwerk Würth GmbH with the designations Granal S-180 and Granal S-40 were used. Aluminium particles of these kinds are sold for use as blasting abrasives. The form of the particles is rounded in each case, with a non-uniform surface.

Granal S-180 particles have a size of between 1.8 and 2.5 mm. Granal S-40 particles have a size of between 0.4 and 0.8 mm.

Glass beads used are surface-silanized Vialux 20 glass beads from Sovitec. These glass beads have diameters in a range between 600 and 1400 μm.

The metal particles and the glass beads (where present) are applied to the surface of the cold plastic using a pressurized gun. Alternatively, however, simple application by scattering would also be possible. That would lead to reduced, but nevertheless sufficient, adhesion.

The formula of the cold plastic used is based on the composition disclosed as Example 2 in WO 2012/100879. That example can be consulted in particular for the composition of the core-shell particles.

Example 1

Intimately combined with 63 parts of methyl methacrylate and 5 parts of butyldiglycol dimethacrylate are 0.05 part of Topanol-O, 13 parts of DEGACRYL® M 339, 9 parts of core-shell particles and 0.5 part of paraffin, and this mixture is heated at 63° C. with vigorous stirring until all of the polymer constituents are dissolved or dispersed. For curing, 1 part of benzoyl peroxide (50 wt % strength formulation in dioctyl phthalate) and 2 parts of N,N-diisopropoxytoluidine are added and are incorporated by stirring at room temperature (21° C.) for one minute.

To effect curing, the composition was poured onto a metal plate. Within one minute after poured application, the surface is strewn with Granal S-180 particles. The amount used corresponds to 280 g of particles/m$^2$. After curing has taken place, specimens are produced in accordance with DIN 50125. Pot life: 14 min; cure time: 30 min; flow time (4 mm): 252 sec Example 2

Like Example 1, but using Granal S-40 instead of Granal S-180, in corresponding amounts.

Example 3

Like Example 1, but with additional scattered application, from a pre-prepared mixture with the Granal S-180 particles, of glass beads, in an amount corresponding to 280 g/m$^2$.

Example 4

Like Example 3, but with the Granal S-180 particles being incorporated into the composition by stirring together with the core-shell particles, and with scattering of glass beads only following poured application.

Comparative Example

Like Example 4, but without aluminium particles.

The radar, or radar backscatter, cross section (RCS) of the marking samples was measured on a marking with a size of 10×10 cm. Measurement took place orthogonally to the application area, using a 76 GHz radar sensor.

Results

Example 1: The radar cross section ascertained is 0.0029 m$^2$.
Example 2: RCS=0.0013 m$^2$
Example 3: RCS=0.0021 m$^2$
Example 4: RCS=0.0014 m$^2$
Comparative example: RCS=0.00021 m$^2$ For an example wavelength of 76 GHz, the examples show a reflection intensified by a factor of at least 60 relative to the comparative example, with an analogous marking not equipped with metal particles.

The invention claimed is:

1. A radiation-reflecting road marking, comprising:
   a matrix material; and
   metal particles having a diameter of between 0.5-2.5 mm,
   wherein the metal particles are spherical, oval, or rounded particles comprising a metal selected from the group consisting of aluminum, magnesium, zinc, and any alloy thereof, and
   wherein the metal particles are in the form of solid or hollow metal particles consisting of the metal, the metal particles comprise a core of a different material coated with the metal, or the metal particles comprise a core of the metal coated with glass, poly(methyl methacrylate), or polycarbonate.

2. The radiation-reflecting road marking according to claim 1, wherein the metal particles consist of the metal.

3. The radiation-reflecting road marking according to claim 1, wherein the metal particles are spherical.

4. The radiation-reflecting road marking according to claim 1, wherein the metal particles consists of aluminum.

5. The radiation-reflecting road marking according to claim 1, wherein the radiation-reflecting road marking is a prefabricated adhesive tape.

6. The radiation-reflecting road marking according to claim 1, wherein the radiation-reflecting road marking is a water-based paint.

7. The radiation-reflecting road marking according to claim 1, further comprising:
   glass beads on a surface of the radiation-reflecting road marking.

8. The radiation-reflecting road marking according to claim 1, wherein the metal particles are situated on a surface of the radiation-reflecting road marking.

9. The radiation-reflecting road marking according to claim 1, wherein the radiation-reflecting road marking reflects microwaves and/or infrared radiation.

10. The radiation-reflecting road marking according to claim 1, wherein the metal particles are provided on a surface of the matrix material with an adhesion promoter and/or the matrix material comprises an adhesion promoter.

11. The radiation-reflecting road marking according claim 10, wherein the adhesion promoter is at least one adhesion promoter selected from the group consisting of a silane, a hydroxyester, an aminoester, an urethane, an isocyanate and an acid copolymerized with a (meth)acrylate.

12. The radiation-reflecting road marking according claim 1, wherein the radiation-reflecting road marking is a cold plastic.

13. The radiation-reflecting road marking according to claim 12, wherein the cold plastic is produced from a two-part reactive resin in which a first component comprises 1.0 to 5.0 wt % of an initiator, and a second component comprises 0.5 to 5.0 wt % of an accelerator, and in that the two-part reactive resin comprises:
   0.1 wt % to 18 wt % of a crosslinker,
   2 wt % to 50 wt % of a monomer,
   0 wt % to 12 wt % of an urethane (meth)acrylate,
   0.5 wt % to 30 wt % of a prepolymer,
   0 wt % to 15 wt % of core-shell particles,
   7 wt % to 15 wt % of an inorganic pigment, and
   30 wt % to 60 wt % of mineral fillers.

14. A method for producing the radiation-reflecting road marking according to claim 12, the method comprising:
   optionally mixing components of two-part system, thereby forming a mixture;
   applying the mixture to a road surface; and
   adding the metal particles and optionally glass beads during or directly after an application of the cold plastic to the road surface.

15. The radiation-reflecting road marking according to claim 13, wherein the initiator is dilauroyl peroxide, dibenzoyl peroxide or both.

16. The radiation-reflecting road marking according to claim 13, wherein the accelerator is a tertiary, aromatically substituted amine.

17. The radiation-reflecting road marking according to claim 13, wherein the inorganic pigment is titanium oxide.

* * * * *